US006305048B1

(12) United States Patent
Salisian

(10) Patent No.: US 6,305,048 B1
(45) Date of Patent: Oct. 23, 2001

(54) ELECTRIC BACKPACK BLOWER AND ACCESSORY OPERATOR

(76) Inventor: Harold Salisian, 2 S. Golden West, Arcadia, CA (US) 91006

( * ) Notice: Subject to any disclaimer, the term of this patent is extended or adjusted under 35 U.S.C. 154(b) by 0 days.

(21) Appl. No.: 09/518,016

(22) Filed: Mar. 3, 2000

Related U.S. Application Data

(60) Provisional application No. 60/123,072, filed on Mar. 3, 1999.

(51) Int. Cl.[7] ........................................................ A47L 5/36
(52) U.S. Cl. ............................. 15/326; 15/327.5; 15/405; 15/413; 15/DIG. 1
(58) Field of Search ................................... 15/327.5, 326, 15/405, 413, DIG. 1; 320/137, 115, 114

(56) References Cited

U.S. PATENT DOCUMENTS

| | | |
|---|---|---|
| 2,586,145 | 2/1952 | Breuer et al. . |
| 3,267,510 * | 8/1966 | Cote ........................................ 15/344 |
| 3,286,446 * | 11/1966 | Happe et al. ..................... 15/327.5 X |
| 3,308,608 * | 3/1967 | Brimberg ......................... 15/327.5 X |
| 3,431,583 | 3/1969 | Daneman . |
| 4,092,580 * | 5/1978 | Prinsze ............................. 320/115 X |
| 4,120,616 | 10/1978 | Dwyer et al. . |
| 4,280,245 | 7/1981 | Hiester . |
| 4,989,323 | 2/1991 | Casper et al. . |
| 5,020,186 * | 6/1991 | Lessig et al. ..................... 15/DIG. 1 |
| 5,052,073 | 10/1991 | Iida . |
| 5,195,208 | 3/1993 | Yamami et al. . |
| 5,709,007 * | 1/1998 | Chiang ............................. 15/DIG. 1 |
| 5,813,088 | 9/1998 | Wagner et al. . |
| 5,908,233 * | 6/1999 | Heskett et al. .................... 320/114 X |
| 6,006,400 * | 12/1999 | Presenza ............................. 15/327.5 |

* cited by examiner

Primary Examiner—Chris K. Moore
(74) Attorney, Agent, or Firm—Gene Scott-Patent Law & Venture Group

(57) ABSTRACT

An enclosure is constructed as a back pack so that it may be worn. Air is conducted into an air intake chamber, then to an air intake plenum by air impeller. An electric motor is coupled with an air impeller, with motor cooling accomplished by the positioning of the electric motor adjacent to a motor cooling intake aperture. A sound absorbing layer lines the enclosure. Air exits through an air exhaust orifice for application in blowing leaves etc. A rotational transmission, terminating with a coupling is adapted for receiving an accessory for operation of the accessory so that a wide range of garden, carpentry and farming accessories may be utilized with the power take-off.

6 Claims, 3 Drawing Sheets

ELECTRIC BACKPACK BLOWER AND ACCESSORY OPERATOR

The present application claims the priority date of a previously filed utility patent application having Ser. No. 60/123,072 and an assigned filing date of Mar. 3, 1999, and which contains subject matter substantially the same as that described and claimed in the present application.

BACKGROUND OF THE INVENTION

1. Field of the Invention

This invention relates generally to portable blowers and power modules, and, more particularly to an electrically driven backpack device that may also be used with various tools taking power from the backpack.

2. Description of Related Art

The following art defines the present state of this field:

Casper et. al. U.S. 4,989,323 describes a portable power unit for use with various power tools.

U.S. Pat. No. 4,451,983 discloses a flexible drive shaft with a drove head that fits into a drive socket. A shroud is turned to align a set screw with the threaded opening to attach the coupling. A power handle assembly is attached to a flexible drive shaft. The flexible drive shaft powers a rotary tool. A tubular liner covers the flexible drive shaft.

U.S. Pat. No. 2,790,292 discloses a rigid shaft with a key and a set screw for attachment to an elbow coupling. The combination has a motor with an output shaft. There is a right angle drive mechanism that transmits rotatable power to a flexible drive shaft. A hand grip is connected to the flexible drive shaft. Portable hand tools can be connected to the flexible shaft.

U.S. Pat. No. 4,341,017 discloses a guide bar mounted on the end of a handle provided with a throttle trigger. A harness carries a drive unit which conducts oil to lines which run through the guide bar to a hydraulic motor which runs a sprocket wheel to drive a saw.

U.S. Pat. No. 4,483,070 discloses a trimmer cutting head mounted on a rod which extends from a pistol grip control handle with a second handle midway on the rod for control. The trimmer cutting head is suspended from a cord that is mounted on a backpack extension. The backpack carries a gasoline engine powered alternator connected to a pair of mount brackets secured to the backpack. The pistol grip handle has a trigger switch that is in circuit with a cutting head motor. The cutting head motor is attached to the trimmer cutting head.

U.S. Pat. No. 3,540,123 discloses a frame to be carried on the back of an operator. The frame has upper and lower mounting plates, a mounting pivot and straps. A control lever is also attached to the frame. A coupling connects the engine to a flexible cable. There are flexible tube portions surrounded by rubber like plastic coverings. A rigid central pipe section is fitted in between the flexible tube sections and has handles. The flexible tube is threaded to a housing that in turn is threaded to a bearing housing. A collar is secured to the housing by clamp screws. The flexible cable has a male end that fits into a square cross section of a sleeve coupling member.

U.S. Pat. No. 4,242,855 discloses a lawn mower engine with an adapter for clipping to a flexible cable mounted within a housing. The flexible cable has an extension for slipping into a rotatable drive. The driver has a square end for fitting into a socket on the end of a second flexible cable within a trimmer. The driver is positioned within the end of the handle of the trimmer.

U.S. Pat. No. 4,098,292 discloses a quick disconnect coupling for detachable connecting a pair of fluid conveying conduits. The coupling 20 is comprised of a female body member 21 and a second tubular or male body member 22. Surrounding the female body member 21 is a locking collar 42 for movement so that when in locking position it forces the restraining balls 44 into an annular recess 31 to interconnect the male body member 22 with the female body member 21.

U.S. Pat. No. 4,541,160 discloses a rotatable flexible shaft for coupling one of several driving members to one of several driven members. The flexible shaft is adaptable as a coupling for any one of many driving members to any one of many driven members wherein the members may have output and input shafts, respectively, of varying sizes. Different adapters may be used to provide the coupling to the different size shafts.

U.S. Pat. No. 4,653,254 discloses a motor-driven lawn and garden device that provides the power source for lawn and garden equipment. The lawn equipment may be a trimmer that is connected by a flexible drive shaft and connected to the trimmer shaft. The patent discloses the connection of the drive shaft to the power driven drive shaft 16 of the lawn mower.

U.S. Pat. No. 4,213,482 discloses a detachable hydraulic coupler that includes a male and female portion. The section of the female portion enclosing the male portion includes a series of locking balls slidable in apertures that extend into a groove in the male portion to lock the coupler portions together. A slidable collar encircling the female portion normally holds the locking balls in locking position.

U.S. Pat. No. 3,611,748 discloses a male ended quick convert flexible drive shaft structure that is particularly adapted for use with an electronic equipment repair and maintenance unit. The male end assembly 70 has two grooves 80 and 90 spaced apart a distance such that when the spring loaded ball 35 is in groove 90 the flexible drive shaft is connected to the motor. On the other hand, while the motor 12 is still running, the flexible drive shaft can be placed in a non-operating drive while the male member is still fixed to the motor housing panel by having the spring loaded ball 35 in the groove 80.

U.S. Pat. No. 4,057,114 discloses a flexible shaft connected directly to the crank shaft of a snowmobile engine by a coupler. The flexible shaft is used to drive an ice auger bit. Attached to the flexible shaft is a reduction gear that rotates the drive shaft of the ice auger bit at a substantially reduced speed.

U.S. Pat. No. 3,505,831 discloses a flexible shaft coupler. The flexible shaft coupler disclosed eliminates the use of bearings of any type.

U.S. Pat. No. 4,664,420 discloses a female pneumatic coupling that releasably engages a groove nipple attached to a pneumatic tool. The locking sleeve has a series of combination locking tumblers which must be rotated to a preselected number so that the locking sleeve may be moved to deactivate the ball bearing latch. Removal of the tool attached to the groove nipple is prevented therefore unless the persons knows the combination of the selected numbers of the locking tumblers.

The prior art teaches various portable power units, one of which can be enclosed in a backpack and powered by either gasoline or electricity. However, the prior art does not teach a portable power unit which is powered by either electrical current or rechargeable batteries and which also has a sound absorbing layer lining the backpack enclosure, thereby reducing operational noise. The present unit is designed for powering a wide range of garden and other utility services tools from the portable backpack. The present invention fulfills these needs and provides further related advantages as described in the following summary.

SUMMARY OF THE INVENTION

The present invention teaches certain benefits in construction and use that give rise to the objectives described below.

The present invention provides a back pack blower apparatus which reduces the noise associated with standard gasoline-powered blowers by at least one-half, and also eliminates reliance on a gasoline-powered engine, thereby contributing to a cleaner atmosphere. The invention comprises an enclosure designed as a backpack so that it may be strapped to the back. Air is conducted into an air intake chamber, then to an air intake plenum and then to an air impeller. An electric motor is coupled with the air impeller, with motor cooling accomplished by the positioning of the electric motor adjacent to a motor cooling intake aperture and motor cooling venting means. A sound absorbing layer lines the enclosure. Air exits through an air exhaust orifice which may be connected to a wide range of possible air driven tools beside a simple blower. An electrical power source connected with a fixed alternating electrical power outlet drives the electric motor. Alternately, the electric power source is a storage battery which may be charged by a built-in battery charger. A utensil lighter plug may be used for battery charging.

A primary objective of the present invention is to provide an apparatus having advantages not taught by the prior art.

Another objective of the apparatus is to provide a blower that is quite.

A still further objective is to provide such an apparatus capable of being powered either by an electric power source connected with a fixed alternating electrical power outlet, or by a storage battery that is charged with a utensil lighter plug, such as is commonly known and available in vehicles.

A still further objective is to provide such an apparatus that includes a power takeoff that is capable of driving different non-powered tools, such as a weed eater, edger, lawn eater, root-mower, vacuum, hand blower, or extension tools such as a chain saw, hedge trimmer, reciprocating saw, motorized broom, rototiller, or grass and weed shear.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
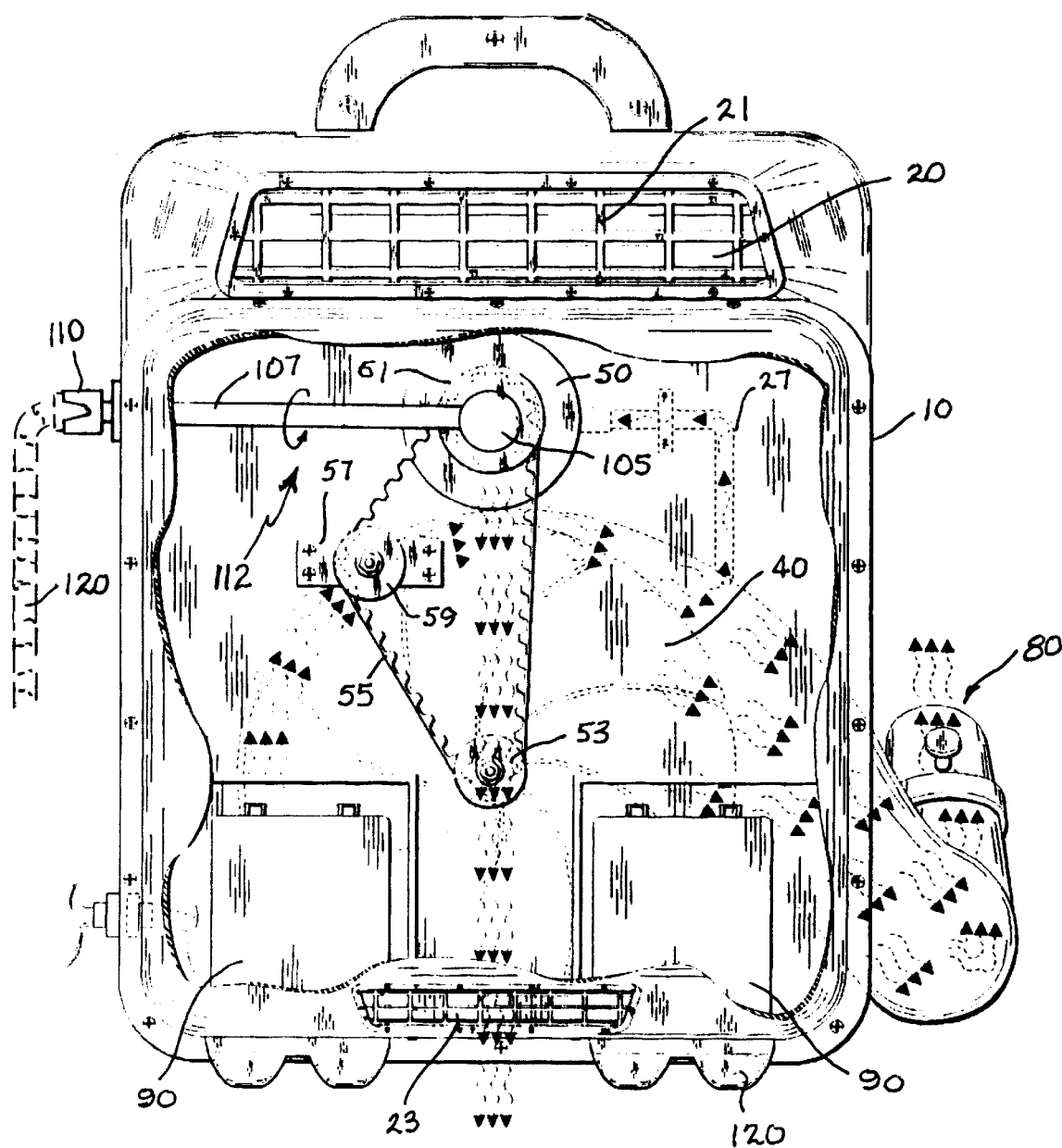
FIG. 1 is a partial cutaway elevational rear view of the preferred embodiment of the present invention.
Figure 2:
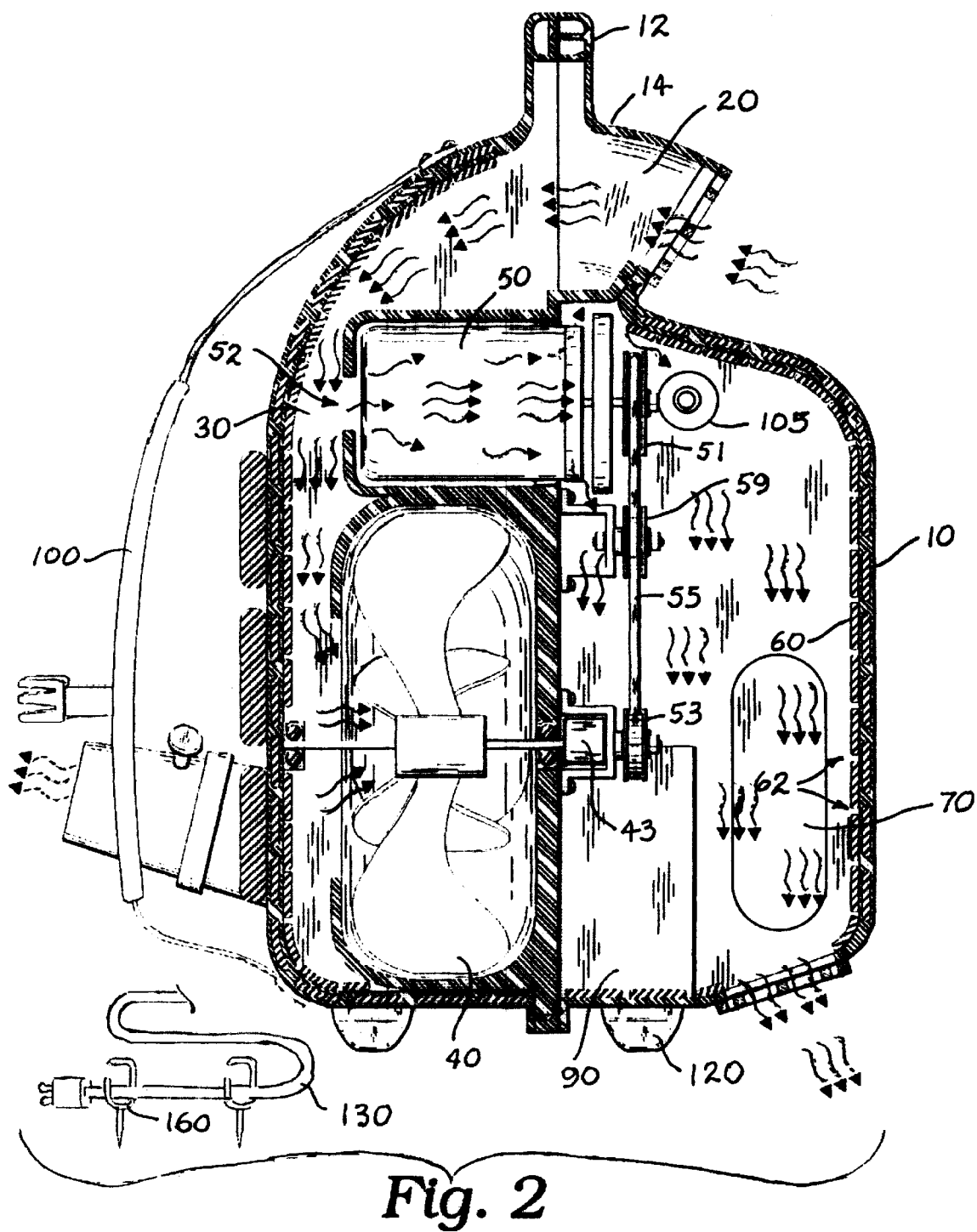
FIG. 2 is a sectional view thereof, taken along line 2—2 of FIG. 1.
Figure 3:
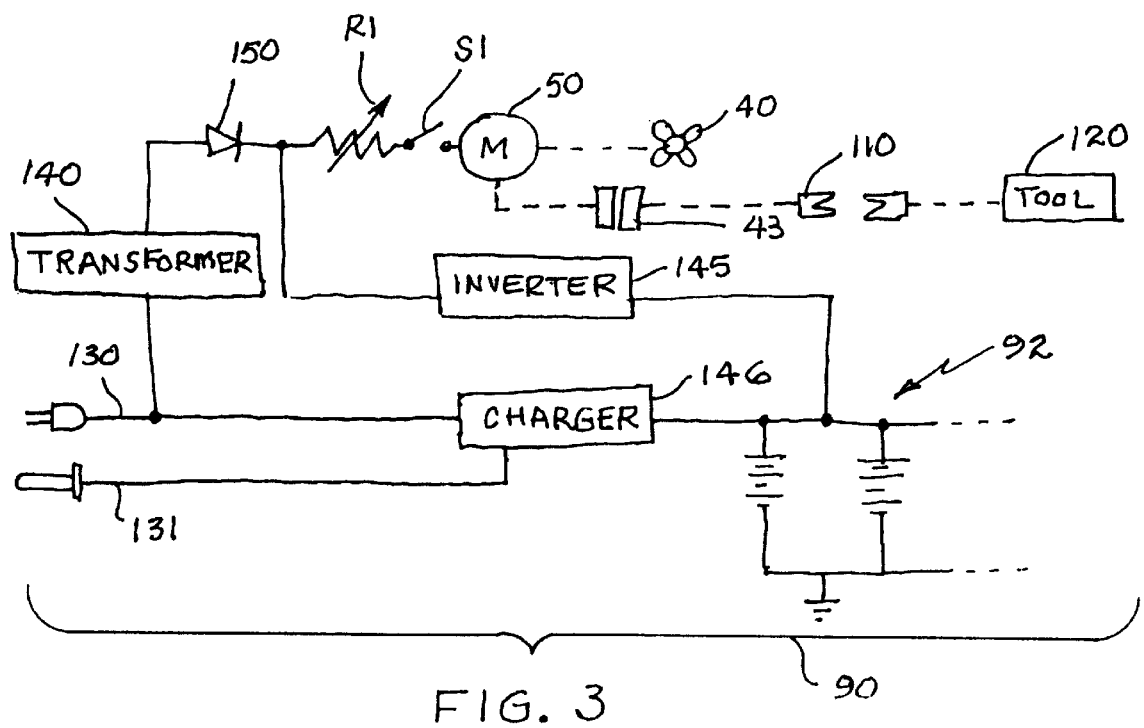
FIG. 3 is an electrical schematic diagram thereof.

The above described drawing FIGS. 1–3 illustrate the invention, a back pack power apparatus comprising an enclosure 10 providing an air intake chamber 20 directed to an air intake plenum 30 and therefrom, to an air impeller 40. An electric motor 50 is coupled, as by belt 55 to the air impeller 40 or may be an integral part of it as is well known. The motor 50 is positioned adjacent to a motor cooling intake aperture 52 so that air from the intake plenum 30 may flow through the motor 50 for cooling it through a parallel path to that of the impeller 40. A sound absorbing layer 60, such as a leaded sheet or other common material, lines the interior of the enclosure 10 and provides a plurality of sound entry orifices 62 as is known in sound absorbing structures in common practice. An air exit plenum 70 is directed to an air exhaust orifice 80 for directing air as desired. An electrical power source 90 is interconnected for powering the electric motor 50. A means for mounting, such as a shoulder harness 100 are used for supporting the enclosure 10 on the back of a person so as to carry the apparatus. The invention further comprises a carrying handle 12 mounted on an upfacing surface 14 of the enclosure 10. A rotational transmission 105 terminates with a coupling 110 and is adapted for receiving an accessory 120 for operation of the accessory. Possible accessories are described below. The present invention is a power pack apparatus that produces less noise than typical gasoline engine powered devices, which produce noise levels of 64.7 Decibels and more. The sound muffling is accomplished by totally enclosing the motor, impeller, and all other moving parts and by employing a special sound baffling system. The invention also includes an electric power source using standard AC electrical power, or storage batteries. Preferably, the invention is powered through a built-in battery charger 146. Alternately, if two 12 v. batteries are connected in parallel or in series, they are used to power a 12 v. or a 24 v. motor. Alternately, when the invention is used with running lights, tools, etc., or with a built-in converter, 110 v. a.c. or d.c. current is decreased to 12 or 24 v. d.c. Alternately, power sources such as a 110 v. a.c. may be used (a rectifier would change this power source to a 110 v. d.c.). Alternately, the battery charger includes a 12 v. d.c. with a utensil lighter plug 131, such as is commonly known and available in vehicles, so that it is possible to charge batteries while one is driving. By eliminating the need for a gasoline engine to power the blower, the invention releases no pollutants and thereby contributes to a cleaner atmosphere.

The invention consists of the following inventive elements which form a novel assembly by virtue of a unique combination: the shoulder harness 100 with a chest buckle, interior sound absorbing layer 60, as previously described, support feet 120, air intake screen 21, and a 110 v a.c. power cord 130 with transformer 140 for delivering utility derived current through the use of a rectifier 150. Alternately, a d.c. power source 92 (batteries) may be used. An inverter or converter 145, or both may be used to drive an a.c. motor 50 with the d.c. power source 92. An on-off switch S1 and speed control R1, such as rheostat are used for control.

Plastic cable helpers 160 direct power cables around flower beds, swimming pools, or other hazardous areas. A drive pulley 51, impeller pulley 53, idler pulley 59, belt adjusting pulley bracket 57, and cotter belt 55, operate, as is known in the art, to provide power transfer from the motor 50 to the impeller 40.

Operationally, as the motor is energized, the invention begins two separate and distinct air flow patterns. The primary air flow pattern pulls air in from the air intake screen 21 and the air then passes by way of the air intake chamber 20, down through the impeller 40, and is pushed into an air tube 27 for cooling the motor 50 and then expelled. The secondary air flow pattern pulls air from the air intake orifice, through the motor air-cooling orifice, through the motor and into the motor chamber. The air cools the drive belt, drive pulley, impeller pulley, belt adjusting pulley, and their bearings. The air is then expelled through the motor cooling vent orifices 23 located at the bottom of the enclosure 10 (see FIG. 1). Alternately, with the addition of the motor cooling tube 27, the motor impeller could be eliminated. With the use of a high efficiency motor, both motor impeller and motor cooling tube may be eliminated. Alternately, the motor and impeller may be combined.

In a second embodiment, the invention is as described above, but includes a power take-off 112 (p.t.o.) as best seen in FIG. 1. The p.t.o. consists of a drive shaft 107 which may be flexible, and if so such flexibility is achieved by using an outer rubberized or flexible sheath, and an optional wire kink protector which protects the flexible drive shaft from "kinking" or breaking. This type of drive shaft is well known in the art. In addition, a multi-angle gear joint 105, may be used, as shown, to bring rotational power out of the enclosure 10 at any selected point. A coupler 110 of any well known type is provided for coupling to external tools. The power take off 112 allows multiple tools to be utilized at the same time by using multiple drive shafts 107. Some examples of tools that could be utilized with the invention include a weed eater, edger, a lawn eater or roto-mower (used to mow down tall weeds, etc.), vacuum, hand blower, and extension tools such as a chain saw, hedge trimmer, reciprocating saw, hedge trimmer, motorized broom, rototiller, and grass and weed shear. The invention can also be used with many other types of tools, both indoor and outdoor types. In case the invention is to be used for driving external accessories but not used as a blower, a clutch 43 is provided to disable the impeller 40.

Benefits of the invention in its second embodiment include price and weight reduction per tool due to the elimination of the motor on every tool, as well as the ability to use a variety of tools, and drive shafts, as well as multiple tools at the sane time with more than one p.t.o. shaft 107.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A back mountable power apparatus comprising:

an enclosure providing therewith in:
   an air intake vent directed to an air intake plenum and therefrom, an air impeller, the impeller adapted for drawing air through the air intake vent into the air intake plenum and therefrom, radially into an exhaust hose;
   an electric motor positioned above, and coupled to, the air impeller, the electric motor and impeller positioned centrally within the enclosure for balance thereof;
   a sound absorbing layer lining on the enclosure providing a plurality of sound entry orifices for receiving and absorbing sound energy within the enclosure;
   a cooling air exhaust orifice within an exit plenum positioned for directing cooling air downwardly and rearwardly;
   the electric motor further coupled to a rotational transmission, the rotational transmission terminating outside the enclosure with a coupling adapted for receiving an accessory; and
   an electrical power source interconnected with the electric motor for driving the electric motor;
and mounted to the exterior of the enclosure, a means for mounting the enclosure onto the back of a person so as to carry the apparatus for doing work.

2. The apparatus of claim 1 further comprising a carrying handle mounted on an upfacing surface of the enclosure.

3. The apparatus of claim 1 wherein the electric power source is an electrical power cord interconnected with a fixed alternating electrical power outlet.

4. The apparatus of claim 1 wherein the electric power source is at least one storage battery.

5. The apparatus of claim 4 further comprising a battery charger for charging a battery of the electric power source.

6. The apparatus of claim 4 further comprising a utensil lighter plug for charging a battery of the electric power source.

* * * * *